United States Patent
Sarkar (10) Patent No.: US 12,242,489 B2
(45) Date of Patent: Mar. 4, 2025

(54) METHOD, SYSTEM AND COMPUTER READABLE STORAGE MEDIUM FOR AN APPLICATION PROGRAM INTERFACE-BASED CONTENT MANAGEMENT SYSTEM

(71) Applicant: JPMorgan Chase Bank, N.A., New York, NY (US)

(72) Inventor: Bodhisatta Sarkar, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/969,271

(22) Filed: Oct. 19, 2022

(65) Prior Publication Data

US 2024/0134864 A1     Apr. 25, 2024
US 2024/0232206 A9     Jul. 11, 2024

(51) Int. Cl.
| | |
|---|---|
| *G06F 16/00* | (2019.01) |
| *G06F 16/2452* | (2019.01) |
| *G06F 16/2457* | (2019.01) |
| *G06F 16/28* | (2019.01) |

(52) U.S. Cl.
CPC .. *G06F 16/24573* (2019.01); *G06F 16/24524* (2019.01); *G06F 16/284* (2019.01); *G06F 16/289* (2019.01)

(58) Field of Classification Search
CPC ......... G06F 16/24573; G06F 16/24524; G06F 16/284; G06F 16/289
See application file for complete search history.

(56) References Cited

U.S. PATENT DOCUMENTS

| | | | |
|---|---|---|---|
| 2017/0083480 A1* | 3/2017 | Salier-Hellendag | G06F 40/166 |
| 2019/0020687 A1* | 1/2019 | Noon | H04L 51/212 |
| 2021/0097083 A1* | 4/2021 | Harris | G06F 21/53 |
| 2021/0150034 A1* | 5/2021 | Rose | G06F 21/577 |
| 2022/0415200 A1* | 12/2022 | Venkatasubramanyam | G09B 7/04 |

OTHER PUBLICATIONS

Microsoft Corporation. 1995. Windows 95: Operating System. Document No. X03-50321. Printing ID . 0000005475-TATUNG. Printed in Taiwan, pp. 28-31. (Year: 1995).*

* cited by examiner

*Primary Examiner* — Paul Kim
(74) *Attorney, Agent, or Firm* — Greenblum & Bernstein, P.L.C.

(57) ABSTRACT

A method and system for operating an application program interface-based content management system. The method and system each comprises: communicating, by an application that is based on a microservices architecture, with a user interface via content APIs that provide for content creation, content modification, content storage, and content retrieval; storing, by the application, within a relational database, relational data, identification data, and access control data; storing, by the application, within a content store that comprises an object storage database, content as objects in buckets of the object storage database; communicating, by a search engine, with the application via search APIs that provide for a full text-based search of the object storage database; storing, by the search engine, within memory of the search engine, metadata that corresponds to the data; and storing, by the search engine, within the memory, reference data that corresponds to the data.

20 Claims, 6 Drawing Sheets

METHOD, SYSTEM AND COMPUTER READABLE STORAGE MEDIUM FOR AN APPLICATION PROGRAM INTERFACE-BASED CONTENT MANAGEMENT SYSTEM

BACKGROUND

1. Field of the Disclosure

This technology generally relates to a method, system and computer-readable storage medium for operating an application program interface-based content management system and, more particularly, to a method, system and computer-readable storage medium for operating a customizable application program interface-based content management system that is scalable yet stable and that can store any type of content and associated metadata.

2. Background Information

Large organizations around the world utilize different content management systems and products to manage their content and metadata. In today's market, these content management systems and products are supplied to large organizations by various vendors. However, there are no existing standards for these content management systems and products. Rather, conventional content management systems and products all come with their own framework, which makes their implementation difficult and costly because the licensing cost for a content management system or product typically ranges in the millions.

Another problem with conventional content management systems and products is that they try to utilize a single monolithic software component to manage their content. As a result, the user interface layer, the implementation layer and the data store of a conventional content management system or product, are all tightly coupled into a single software component. Therefore, the user interface layer, the implementation layer and the data store of a conventional content management system or product cannot be customized to suit changing business needs.

Accordingly, in today's market, there is a need to solve these problems with a stable, scalable and highly customizable application program interface-based content management system that can store any type of content and associated metadata.

SUMMARY

The present disclosure, through one or more of its various aspects, embodiments, and/or specific features or sub-component, provides, inter alia, various systems, servers, devices, methods, media, programs and platforms for operating an application program interface-based content management system.

According to an aspect of the present disclosure, a method is provided for operating an application program interface (API)-based content management system (CMS). The method may comprise: communicating, by an application that is based on a microservices architecture, with a user interface via content APIs that provide for content creation, content modification, content storage, and content retrieval; storing, by the application, within a relational database, relational data, identification data, and access control data; storing, by the application, within a content store that comprises an object storage database, content as objects in buckets of the object storage database; communicating, by a search engine, with the application via search APIs that provide a full text-based search of the object storage database; storing, by the search engine, within memory of the search engine, metadata that corresponds to the data; and storing, by the search engine, within the memory, reference data that corresponds to the data. The objects may comprise at least one from among a web document, image file, audio file, and video file. The reference data may comprise a path to the content.

The method may further comprise: breaking up, by the application, the first content into first content pieces; creating, by the application, first respective metadata that respectively correspond to the first content pieces; storing, by the application, within the object storage database, the first content pieces as a respective first set of objects; transmitting, by the application, to the search engine, the first respective metadata that respectively correspond to the first content pieces; transmitting, by the application, to the search engine, first respective reference data that respectively correspond to the first content pieces; storing, by the search engine, within the memory, the first respective metadata that respectively correspond to the first content pieces; and storing, by the search engine, within the memory, the first respective reference data that respectively correspond to the first content pieces. The respective first set of objects may respectively comprise the first content pieces.

The method may further comprise: receiving, by the user interface, from a user, a request for the first content; transmitting, by the user interface, to the application, the request for the first content; receiving, by the application, from the user interface, the request for the first content; determining, by the application, which of the first content pieces are permitted first content pieces, by utilizing the identification data and the access control data; transmitting, by the application, to the search engine, a request for the permitted first content pieces; receiving, by the application, from the search engine, permitted first reference data that respectively correspond to the permitted first content pieces; receiving, by the application, from the search engine, permitted first metadata that respectively correspond to the permitted first content pieces; retrieving, by the application, from the object storage database, the permitted first content pieces, by utilizing the permitted first reference data that respectively correspond to the permitted first content pieces; assembling, by the application, the permitted first content pieces to create permitted first content, by utilizing the permitted first metadata that respectively correspond to the permitted first content pieces; and transmitting, by the application, the permitted first content to the user interface to present to the user.

The method may further comprise: providing, by the application, to the user interface, placeholders to present along with the permitted first content; and presenting, by the user interface, the placeholders along with the permitted first content. The placeholders may be presented in place of redacted first content with respect to the first content, the first content may comprise the permitted first content and the redacted first content, and the permitted first content may be different from the redacted first content.

The method may further comprise: receiving, by the user interface, from a user, identification information and access control information; transmitting, by the user interface, to the application, the identification information and the access control information; and controlling, by the application, access to the content, by utilizing the identification data, the access control data, the identification information, and the access control information.

The method may further comprise: utilizing by the application, implicit data of a user to determine identification information of the user; and determining, by the application, by utilizing the access control data, the identification data and the identification information of the user, whether the user is permitted to access a first content. The identification information of the user may comprise a job of the user and a department in which the user works.

The method may further comprise: selecting the user interface from among a plurality of user interfaces that are customized to be fully compatible with corresponding computer systems of an organization. There may be a one-to-one correspondence between the plurality of user interfaces and the corresponding computer systems of the organization.

The corresponding computer systems may utilize the content in a unique manner from each other.

Vulnerabilities of the CMS may be removed by upgrading the application.

According to another aspect of the present disclosure, a system is provided for operating an API-based CMS. The system may comprise: an application that is based on a microservices architecture; a user interface that communicates with the application via content APIs that provide for content creation, content modification, content storage, and content retrieval; a relational database that stores relational data, identification data, and access control data; and a content store. The content store may comprise: an object storage database that stores content as objects in buckets; and a search engine that comprises memory. The search engine may be configured to: communicate with the application via search APIs that provide a full text-based search of the object storage database; store, within the memory, metadata that corresponds to the content; and store, within the memory, reference data that corresponds to the content. The objects may comprise at least one from among a web document, image file, audio file, and video file, and the reference data may comprise a path to the content.

The application may be configured to: break up the first content into first content pieces; create first respective metadata that respectively correspond to the first content pieces; store, within the object storage database, the first content pieces as a respective first set of objects; transmit, to the search engine, first respective metadata that respectively correspond to the first content pieces; and transmit, to the search engine, first respective reference data that respectively correspond to the first content pieces. The object storage database may be configured to store the first respective first set of objects. The search engine may be further configured to: store, within the memory, the first respective metadata that respectively correspond to the first content pieces; and store, within the memory, first respective reference data that respectively correspond to the first content pieces.

The user interface may be configured to: receive, from a user, a request for the first content; transmit, to the application, the request for the first content. The application may be further configured to: receive, from the user interface, the request for the first content; determine which of the first content pieces are permitted first content pieces, by utilizing the identification data and the access control data; transmit, to the search engine, a request for the permitted first content pieces; receive, from the search engine, permitted first reference data that respectively correspond to the permitted first content pieces; receive, from the search engine, permitted first metadata that respectively correspond to the permitted first content pieces; retrieve, from the object storage database, the permitted first content pieces, by utilizing the permitted first reference data that correspond to the permitted first content pieces; assemble the permitted first content pieces to create permitted first content, by utilizing the permitted first metadata that correspond to the permitted first content pieces; and transmit the permitted first content to the user interface to present the permitted first content to the user.

The application may be further configured to provide, to the user interface, placeholders to present along with the permitted first content. The user interface may be further configured to: present the placeholders along with the permitted first content. The placeholders may be presented in place of redacted first content with respect to the first content, the first content may comprise the permitted first content and the redacted first content, and the permitted first content may be different from the redacted first content.

The user interface may be configured to: receive, from a user, identification information and access control information; and transmit, to the application, the identification information and the access control information. The application may be configured to control access to the content, by utilizing the identification data, the access control data, the identification information and the access control information.

The application may be further configured to: utilize implicit data of a user to determine identification information of the user; and determine, by utilizing the access control information and the identification information of the user, whether the user is permitted to access a first content. The identification information of the user may comprise a job of the user and a department in which the user works The system may be configured to: permit a selection of the user interface from among a plurality of user interfaces that are customized to be fully compatible with corresponding computer systems of an organization. There may be a one-to-one correspondence between the plurality of user interfaces and the corresponding computer systems of the organization.

The corresponding computer systems may utilize the content in a unique manner from each other.

Vulnerabilities of the CMS may be removed by upgrading the application.

According to yet another aspect of the present disclosure, a non-transitory computer-readable storage medium that stores instructions is provided for operating an API-based CMS. The instructions may comprise: communicating, by an application that is based on a microservices architecture, with a user interface via content APIs that provide for content creation, content modification, content storage, and content retrieval; storing, by the application, within a relational database, relational data, identification data, and access control data; storing, by the application, within a content store that comprises an object storage database, content as objects in buckets of the object storage database; communicating, by a search engine, with the application via search APIs that provide a full text-based search of the object storage database; storing, by the search engine, within memory of the search engine, metadata that corresponds to the data; and storing, by the search engine, within the memory, reference data that corresponds to the data. The objects may comprise at least one from among a web document, image file, audio file, and video file. The reference data may comprise a path to the content.

The instructions may further comprise: breaking up, by the application, the first content into first content pieces; creating, by the application, first respective metadata that respectively correspond to the first content pieces; storing, by the application, within the object storage database, the first content pieces as a respective first set of objects; transmitting, by the application, to the search engine, the first respective metadata that respectively correspond to the first content pieces; transmitting, by the application, to the search engine, first respective reference data that respectively correspond to the first content pieces; storing, by the search engine, within the memory, the first respective metadata that respectively correspond to the first content pieces; and storing, by the search engine, within the memory, the first respective reference data that respectively correspond to the first content pieces. The respective first set of objects may respectively comprise the first content pieces.

The instructions may further comprise: receiving, by the user interface, from a user, a request for the first content; transmitting, by the user interface, to the application, the request for the first content; receiving, by the application, from the user interface, the request for the first content; determining, by the application, which of the first content pieces are permitted first content pieces, by utilizing the identification data and the access control data; transmitting, by the application, to the search engine, a request for the permitted first content pieces; receiving, by the application, from the search engine, permitted first reference data that respectively correspond to the permitted first content pieces; receiving, by the application, from the search engine, permitted first metadata that respectively correspond to the permitted first content pieces; retrieving, by the application, from the object storage database, the permitted first content pieces, by utilizing the permitted first reference data that respectively correspond to the permitted first content pieces; assembling, by the application, the permitted first content pieces to create permitted first content, by utilizing the permitted first metadata that respectively correspond to the permitted first content pieces; and transmitting, by the application, the permitted first content to the user interface to present to the user.

The instructions may further comprise: providing, by the application, to the user interface, placeholders to present along with the permitted first content; and presenting, by the user interface, the placeholders along with the permitted first content. The placeholders may be presented in place of redacted first content with respect to the first content, the first content may comprise the permitted first content and the redacted first content, and the permitted first content may be different from the redacted first content.

The instructions may further comprise: receiving, by the user interface, from a user, identification information and access control information; transmitting, by the user interface, to the application, the identification information and the access control information; and controlling, by the application, access to the content, by utilizing the identification data, the access control data, the identification information, and the access control information.

The instructions may further comprise: utilizing by the application, implicit data of a user to determine identification information of the user; and determining, by the application, by utilizing the access control data, the identification data and the identification information of the user, whether the user is permitted to access a first content. The identification information of the user may comprise a job of the user and a department in which the user works.

The instructions may further comprise: selecting the user interface from among a plurality of user interfaces that are customized to be fully compatible with corresponding computer systems of an organization. There may be a one-to-one correspondence between the plurality of user interfaces and the corresponding computer systems of the organization.

The corresponding computer systems may utilize the content in a unique manner from each other.

The vulnerabilities of the CMS may be removed by upgrading the application.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
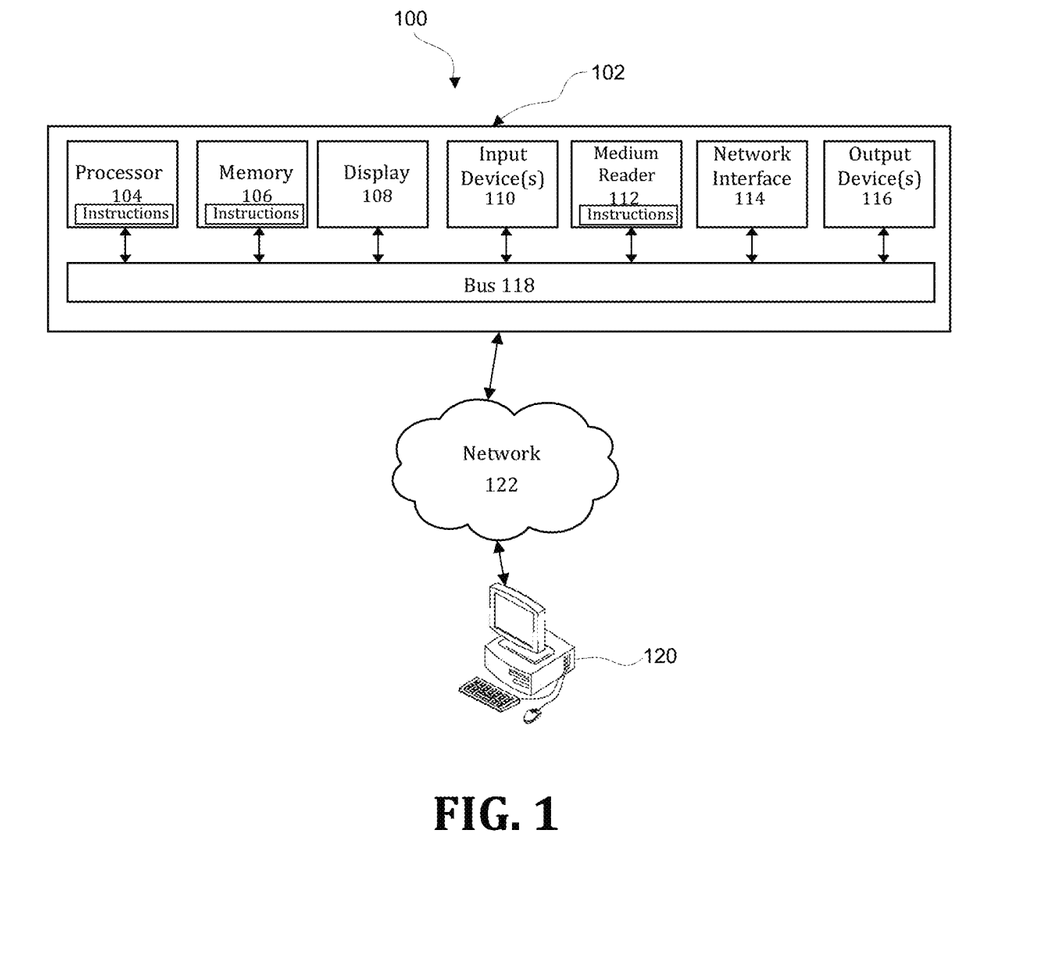
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for operating a stable, scalable and highly customizable API-based CMS that can store any type of content and associated metadata.

Figure 2:
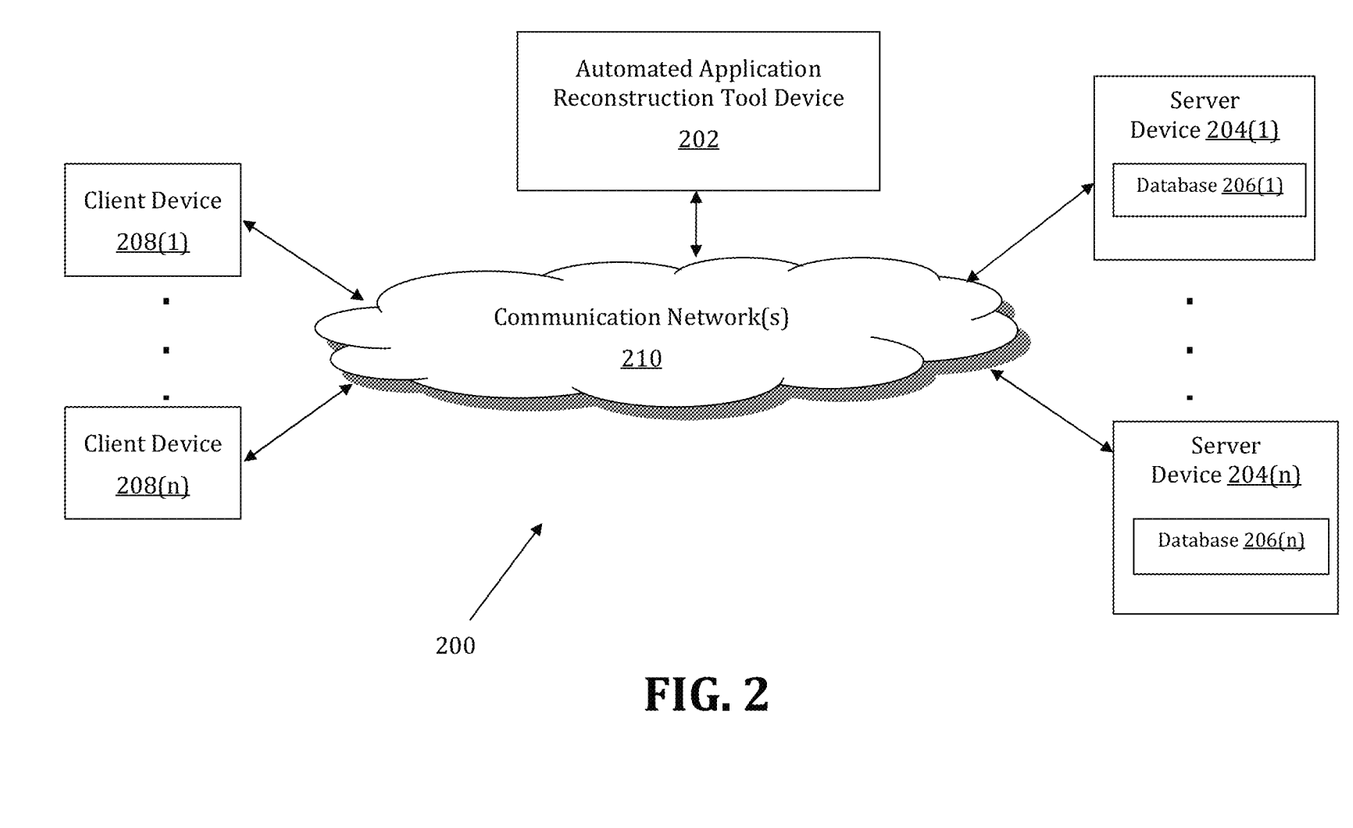
FIG. 2 illustrates an exemplary diagram of a network environment.

Referring to FIG. 2, a schematic of an exemplary network environment 200 for implementing a method for operating a customizable application program interface (API)-based content management system (CMS) is illustrated. In an exemplary embodiment, the method is executable on any networked computer platform, such as, for example, a personal computer (PC).

The method for operating a customizable API-based CMS may be implemented by an API-based Content Management Tool (ACMT) device 202. The ACMT device 202 may be the same or similar to the computer system 102 as described with respect to FIG. 1. The ACMT device 202 may be a rack-mounted server in a datacenter, an embedded microcontroller (MCU) in an electronic device, or another type of headless system, which is a computer system or device that is configured to operate without a monitor, keyboard and mouse. The ACMT device 202 may store one or more applications that can include executable instructions that, when executed by the ACMT device 202, cause the ACMT device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ACMT device 202 itself, may be located in virtual server(s) running in a cloud-based computing environment rather than being tied to one or more specific physical network computing devices. Also, the application(s) may be running in one or more virtual machines (VMs) executing on the ACMT device 202. Additionally, in one or more embodiments of this technology, virtual machine(s) running on the ACMT device 202 may be managed or supervised by a hypervisor.

In the network environment 200 of FIG. 2, the ACMT device 202 is coupled to a plurality of server devices 204(1)-204(n) that hosts a plurality of databases 206(1)-206(n), and also to a plurality of client devices 208(1)-208(n) via communication network(s) 210. A communication interface of the ACMT device 202, such as the network interface 114 of the computer system 102 of FIG. 1, operatively couples and communicates between the ACMT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ACMT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and ACMT devices that efficiently implement a method for operating a stable, scalable and highly customizable API-based CMS that can store any type of content and associated metadata.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ACMT device 202 may be a standalone device or integrated with one or more other devices or apparatuses, such as one or more of the server devices 204(1)-204(n), for example. In one particular example, the ACMT device 202 may include or be hosted by one of the server devices 204(1)-204(n), and other arrangements are also possible. Moreover, one or more of the devices of the ACMT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ACMT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to a content store and a relational data, identification data and access control data database.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ACMT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ACMT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ACMT device 202, the server devices 204(1)-204(n), the databases 206(1)-206(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ACMT device 202, the server devices 204(1)-204(n), the databases 206(1)-206(n), or the client devices 208(1)-208(n), for example, may be configured to operate as virtual instances on the same physical machine. In other words, one or more of the ACMT device 202, the server devices 204(1)-204(n), the databases 206(1)-206(n), or the client devices 208(1)-208(n) may operate on the same physical device rather than as separate devices communicating through communication network(s) 210. Additionally, there may be more or fewer ACMT devices 202, server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
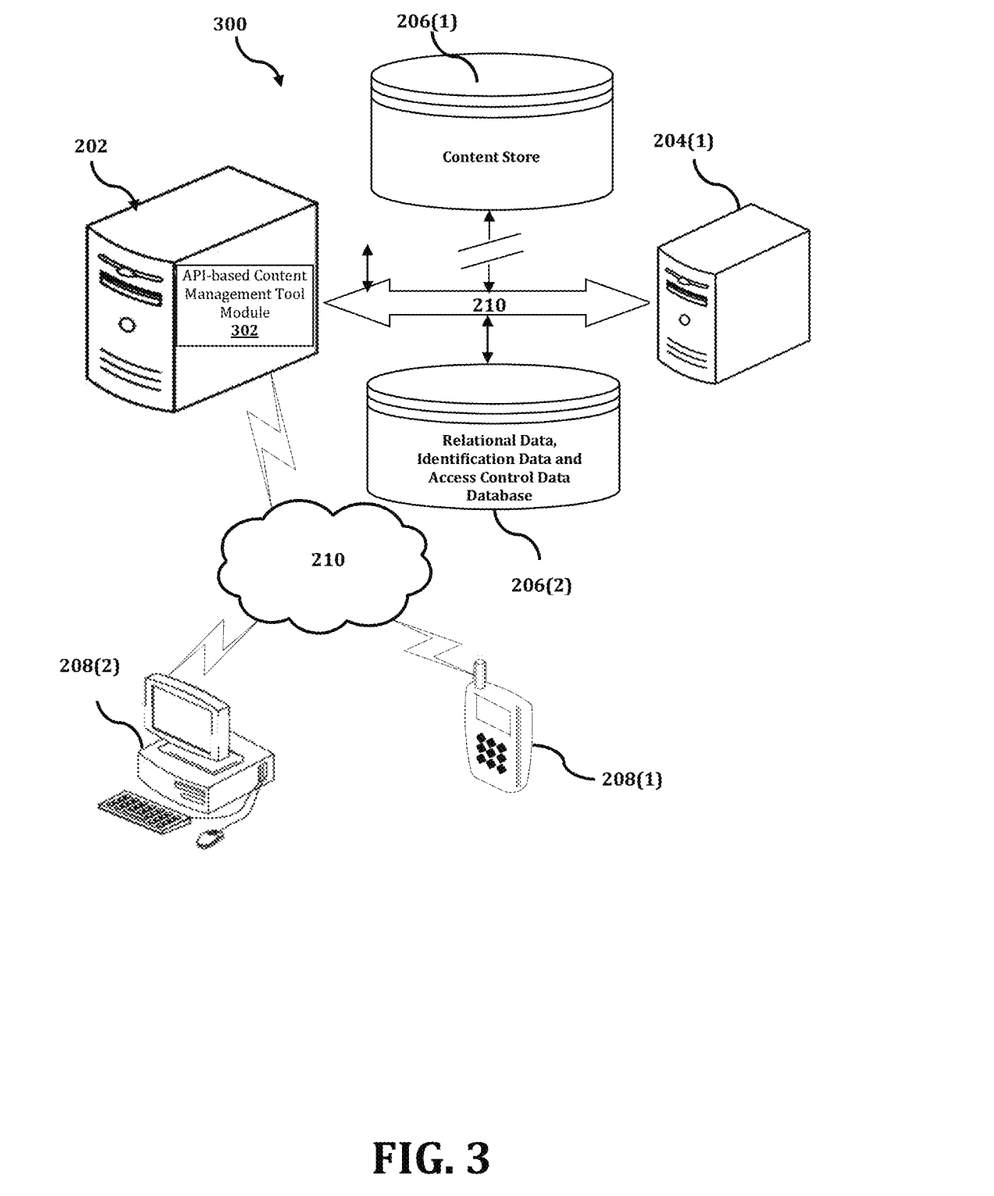
FIG. 3 shows an exemplary system for implementing a method for operating a customizable API-based CMS that is scalable yet stable and that can store any type of content and associated metadata.

The ACMT device 202 is described and illustrated in FIG. 3 as including API-based content management tool module 302, although it may include other rules, policies, modules, databases, or applications, for example. As will be described below, API-based content management tool module 302 is configured to implement a method for operating a stable, scalable and highly customizable API-based CMS that can store any type of content and associated metadata. API-based content management tool module 302 may be software that is based on a microservices architecture and/or an open-source Java-based framework, such as Spring Boot. In addition, API-based content management tool module 302 may be upgraded to improve security, to add new features and/or to remove vulnerabilities.

An exemplary process 300 for operating an API-based CMS by utilizing the network environment of FIG. 2 is illustrated as being executed in FIG. 3. Specifically, a first client device 208(1) and a second client device 208(2) are illustrated as being in communication with ACMT device 202. In this regard, the first client device 208(1) and the second client device 208(2) may be "clients" of the ACMT device 202 and are described herein as such. Nevertheless, it is to be known and understood that the first client device 208(1) and/or the second client device 208(2) need not necessarily be "clients" of the ACMT device 202, or any entity described in association therewith herein. Any additional or alternative relationship may exist between either or both of the first client device 208(1) and the second client device 208(2) and the ACMT device 202, or no relationship may exist.

Further, ACMT device 202 is illustrated as being able to access a content store 206(1), and a relational data, identification data and access control data database 206(2). The API-based content management tool module 302 may be configured to access these databases for implementing a method for operating a stable, scalable and highly customizable API-based CMS that can store any type of content and associated metadata.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization. The first client device 208(1) represent, for example, one or more computer systems of a department within the organization. Of course, the first client device 208(1) may include one or more of any of the devices described herein. The second client device 208(2) may be, for example, one or more computer systems of another department within the organization. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the ACMT device 202 via broadband or cellular communication. Of course, these embodiments are merely exemplary and are not limiting or exhaustive.

API-based content management tool module 302 may execute a process for operating a stable, scalable and highly customizable API-based CMS that can store any type of content and associated metadata. An exemplary process for operating an API-based CMS is generally indicated at flowchart 400 in FIG. 4 and at flowchart 500 in FIG. 5.

Figure 4:
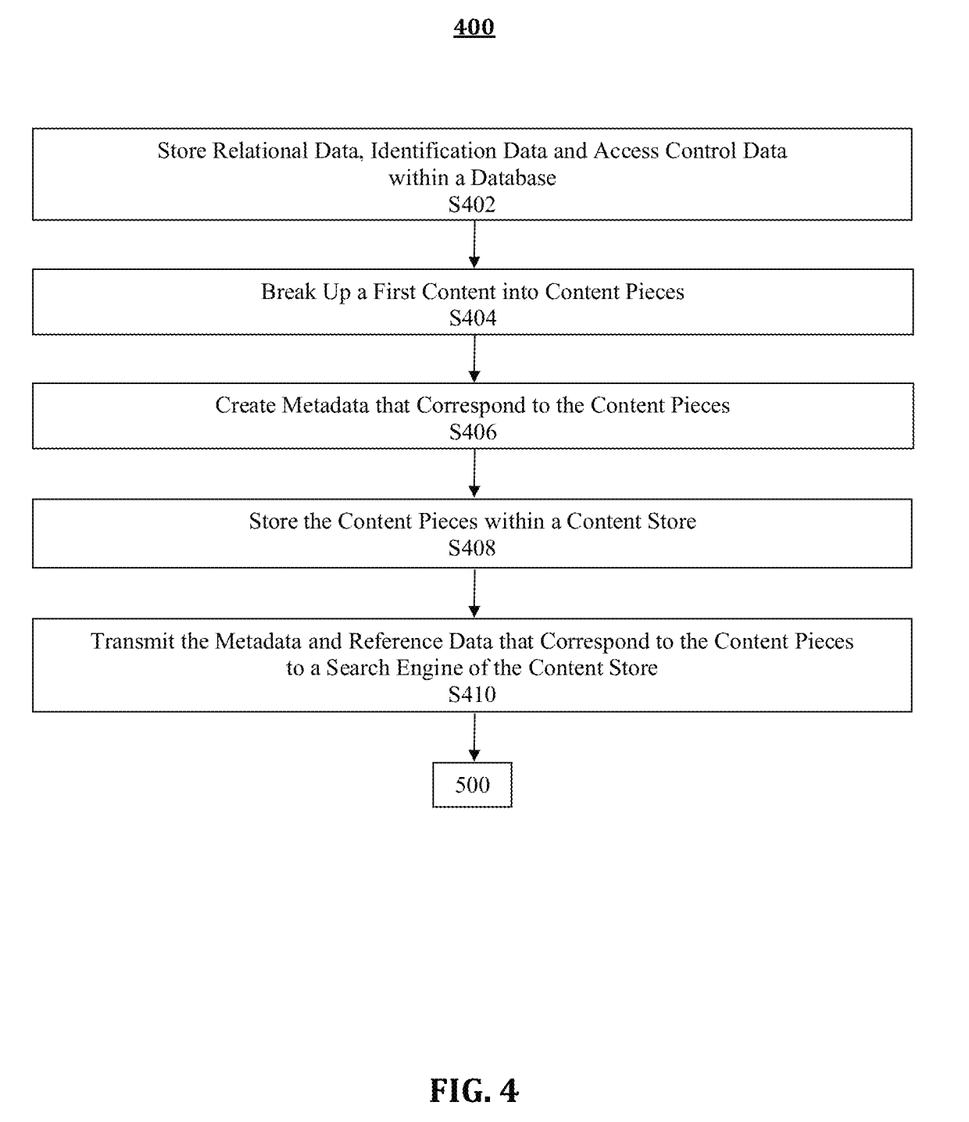
FIG. 4 is a flowchart of an exemplary process for implementing a method for operating a stable, scalable and customizable API-based CMS to store any type of content and associated metadata.

In process 400 of FIG. 4, at step S402, API-based content management tool module 302 stores relational data, identification data and access control data. The relational data, identification data and access control data are stored within a database, such as relational database 206(2).

Relational data may comprise one or more logos, one or more trademarks and/or one or more letterheads, as well as information describing where each should be displayed. Identification data may identify a particular user and/or device.

Identification data may also identify a job position to which a particular user and/or device belongs, and/or identification data may identify a department within an organization to which a particular user and/or device belongs. An organization my include a plurality of departments, and each department of the plurality of departments may have its own computer system that uses content in a unique manner from the computer systems of each of the other departments of the plurality of departments. For example, the computer system of each department of the plurality of departments may tailor content for the unique tasks and objectives of its department. For example, the computer system of each department of the plurality of departments may include a customizable user interface that is tailored to present content in a unique manner that is tailored to the unique tasks and objectives of the department to which each computer system belongs. The customizable interface may be the same as or similar to user interface 602.

Access control data may include credentials, privileges, permissions and/or access levels, for at least one of a particular user, device, content and/or piece of content.

Step S402 may be performed automatically and/or manually, and step S402 may be performed to setup, initialize and/or maintain, a stable, scalable and highly customizable API-based CMS that can store any type of content and associated metadata. Step S402 may be performed manually by a user and/or administrator. Step S402 may be performed automatically via one or more from among executable instructions, microservices software, artificial intelligence, machine learning and/or a neural network.

For example, a machine learning algorithm, such as a deep learning algorithm of a neural network, may be trained by using information from relational data, identification data and access control data database 206(2). Relational data, identification data and access control data from database 206(2) may include historical data that relates to one or more content and/or content pieces.

At step S404, API-based content management tool module 302 breaks up a first content into content pieces. The first content may be received by the API-based content management tool module 302, from at least one from among a memory, a particular user and/or an administrator. User interface 602 may have been utilized to obtain the first content from an external source. Alternatively, user interface 602 may have utilized a feature, such as a rich text editor, to create the first content. The rich text editor can create various types of content, such as a HyperText Markup Language (HTML) file/document. Content APIs may be utilized to transmit the first content to API-based content management tool module 302.

Step S404 may be performed automatically and/or manually, and step S404 may be performed to setup and/or initialize a stable, scalable and highly customizable API-based CMS that can store any type of content and associated metadata. Step S404 may be performed manually by a user and/or administrator. Step S404 may be performed automatically via one or more from among executable instructions, microservices software, artificial intelligence, machine learning and/or a neural network.

For example, a machine learning algorithm, such as a deep learning algorithm of a neural network, may be trained by using information from relational data, identification data and access control data database 206(2). Relational data, identification data and access control data from database 206(2) may include historical data that relates to one or more content and/or content pieces.

At step S406, API-based content management tool module 302 creates metadata that correspond to the content pieces that were created at step S404. Metadata that correspond to content pieces, may indicate various attributes of the content pieces, such as size, location and how the content pieces relate to one another with respect to the content from which they were created at step S404. For example, metadata that correspond to content pieces, may indicate how the content pieces may be assembled to create content from which the content pieces were created, for example, at step S404.

At step S408, API-based content management tool module 302 stores content and/or content pieces within a database, such as content store 206(1). API-based content management tool module 302 obtains reference data when content and/or content pieces are stored within a database, such as content store 206(1). For example, at step S408, content store 206(1) and/or API-based content management tool module 302 may indicate one or more paths that identify locations within content store 206(1), that correspond to content and/or content pieces that have been stored and/or are being stored. The reference data may include the one or more paths that identify locations within content store 206(1), that correspond to content and/or content pieces that have been stored and/or are being stored.

At step S410, API-based content management tool module 302 transmits metadata created at step S406 and reference data obtained at step S408. At step S410, the metadata created at step S406 and the reference data obtained at step S408 are both transmitted to a search engine of a database, such as content store 206(1). API-based content management tool module 302 may utilize search APIs to transmit both the metadata created at step S406 and the reference data obtained at step S408, to a search engine of a database, such as content store 206(1). A database, such as content store 206(1), may have a search engine that comprises memory. Once the search engine receives the metadata and reference data transmitted at step S410, the search engine may store the metadata and reference data transmitted at step S410. The metadata and reference data that is transmitted at step S410 may be stored in memory of the search engine.

The above steps S402-S410 may be repeated for a variety of content and/or content pieces. Irrespective of how many times the above steps S402-S410 are repeated, these steps S402-S410 may be followed by process 500 of FIG. 5.

Figure 5:
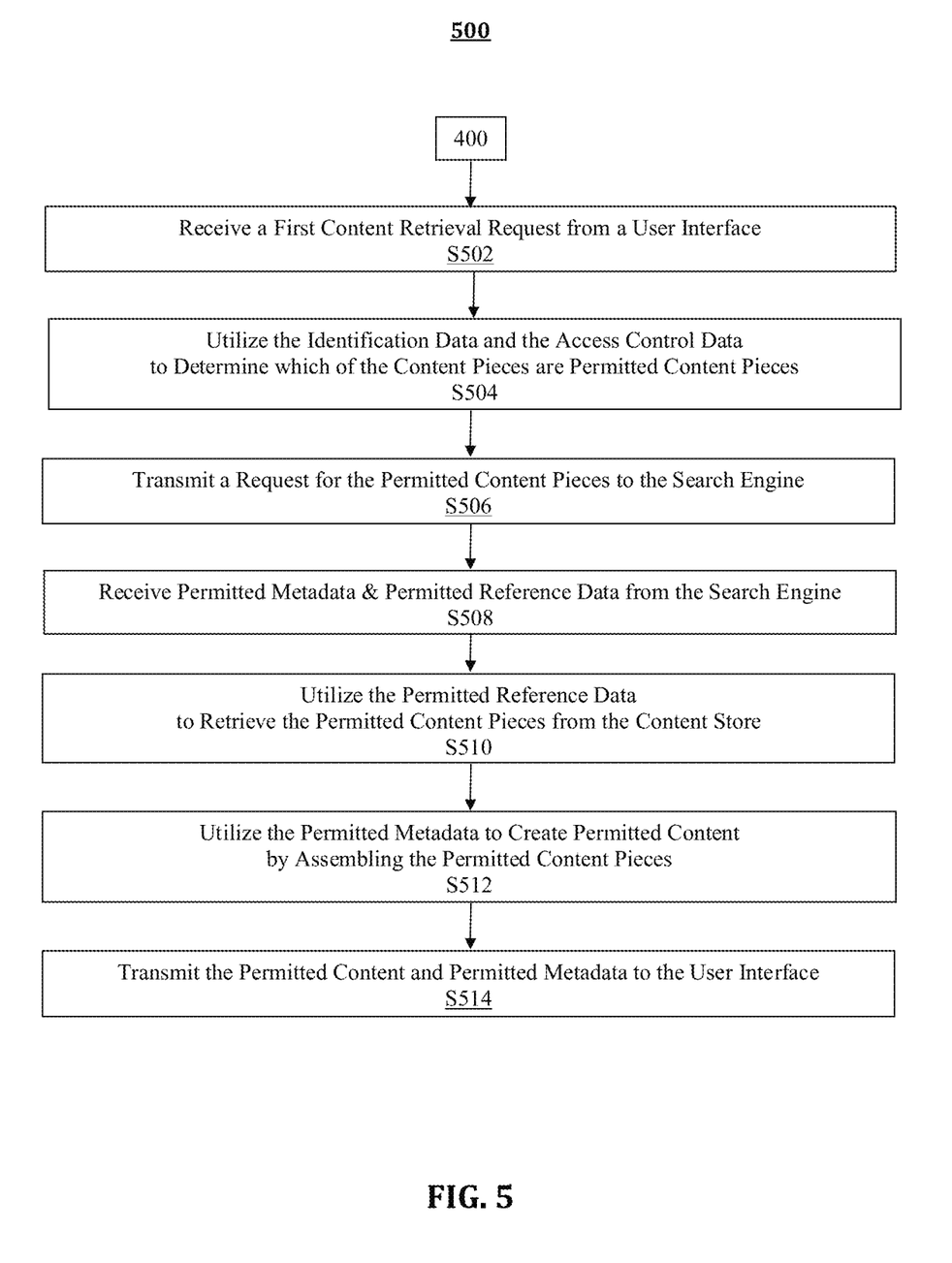
FIG. 5 is a flowchart of an exemplary process for implementing a method for operating a stable, scalable and customizable API-based CMS to retrieve any type of content and associated metadata.

In process 500 of FIG. 5, at step S502, API-based content management tool module 302 receives a first content retrieval request from a user interface. A user interface may utilize content APIs to transmit a request for first content to API-based content management tool module 302. A user and/or user device, such as a client device 208, may enter and submit a first content retrieval request via a user interface.

At step S504, API-based content management tool module 302 utilizes identification data and access control data to determine which content and/or content pieces are permitted content and/or permitted content pieces. Permitted content and/or permitted content pieces are content and/or content pieces that a user and/or user device is permitted to access. Accordingly, at step S504, identification data and access control data are utilized to determine which content and/or content pieces, a user and/or user device may be permitted to access.

In order to determine which content and/or content pieces are permitted content and/or permitted content pieces, API-based content management tool module 302 may obtain identification information and/or access control information from a user and/or user device that submits a request for content via a user interface. In order to determine which content and/or content pieces are permitted content and/or permitted content pieces, identification information and/or access control information may be compared to identification data and access control data. A result of this comparison may indicate which content and/or content pieces, a user and/or user device may be permitted to access.

At step S506, API-based content management tool module 302 transmits a request for permitted content and/or permitted content pieces to a search engine of a database, such as content store 206(1). A request for permitted content and/or permitted content pieces identifies the permitted content and/or permitted content pieces. API-based content management tool module 302 may utilize search APIs to transmit a request for permitted content and/or permitted content pieces to a search engine of a database, such as a content store 206(1).

At step S508, API-based content management tool module 302 receives permitted metadata and permitted reference data from a search engine of a database, such as content store 206(1). A search engine of a database, such as content store 206(1), may utilize search APIs to transmit permitted metadata and permitted reference data to API-based content management tool module 302.

Permitted metadata may indicate various attributes of permitted content and/or permitted content pieces, such as size, location and how permitted content pieces relate to one another with respect to content from which they were created. For example, permitted metadata that correspond to permitted content pieces, may indicate how the permitted content pieces may be assembled to create permitted content, which is a censored version of the content from which the permitted content pieces were created Permitted reference data may include the one or more paths that identify locations within content store 206(1), that correspond to permitted content and/or permitted content pieces that have been stored and/or are being stored.

At step S510, API-based content management tool module 302 utilizes permitted reference data to retrieve permitted content pieces from a database, such as content store 206(1). For example, API-based content management tool module 302 may utilize permitted reference data to retrieve permitted content pieces from one or more paths that identify database locations, that correspond to permitted content and/or permitted content pieces that have been stored within a database, such as content store 206(1).

At step S512, API-based content management tool module 302 utilizes permitted metadata to create permitted content by assembling permitted content pieces.

At step S514, API-based content management tool module 302 transmits permitted content to a user interface for use by a user and/or user device, such as client device 208. A user and/or user device, such as client device 208, may use permitted content by displaying the permitted content via the user interface.

Figure 6:
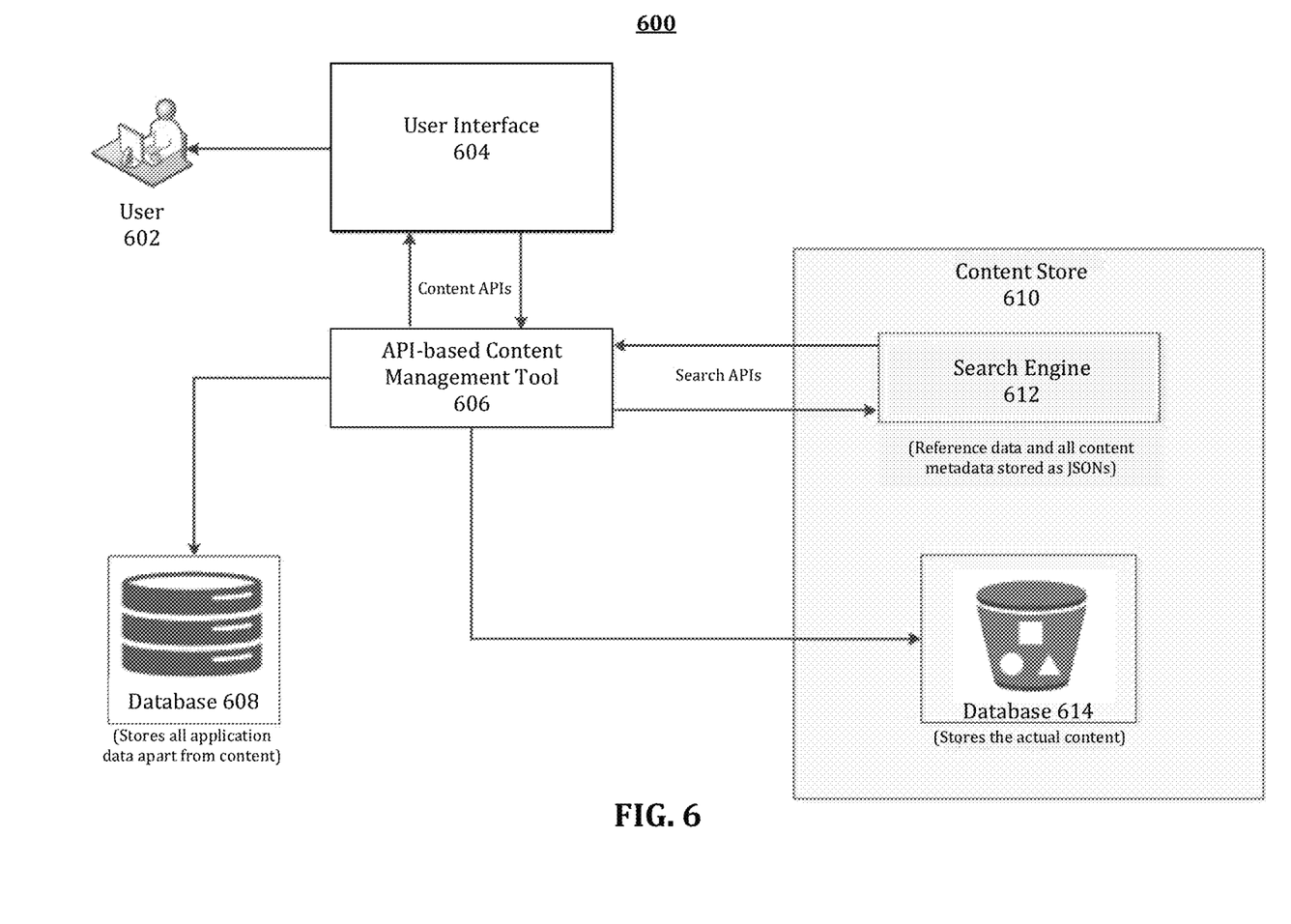
FIG. 6 is a flow diagram that illustrates an exemplary system for implementing a method for operating a customizable API-based CMS that is scalable yet stable and that can store any type of content and associated metadata.

FIG. 6 is a flow diagram is a flow diagram that illustrates an exemplary system 600 for implementing a method for operating a customizable API-based CMS that is scalable yet stable and that can store any type of content and associated metadata. As illustrated in the flow diagram, system 600 includes a user and/or user device 602, user interface 604, API-based content management tool 606, relational database 608, and content store 610. Each of these components 602-610 of system 600 is loosely coupled to each other and, therefore, may be modified separately and independently without compromising the collective interoperability of the components 602-610 of system 600. Additionally, as also illustrated in the flow diagram, content store 610 includes search engine 612 and database 614, which are also loosely coupled to the other components 602-608 of system 600 as well as to each other. User device 602 may be the same as or similar to one or more client devices 208.

The flow diagram of FIG. 6 also illustrates that user interface 604 and API-based content management tool 606 may utilize content APIs to communicate with one another. Content APIs may comprise RESTful APIs. User interface 604 and API-based content management tool 606 may utilize content APIs to transfer content to and from one another. One or more client devices 208 may comprise or be connected to user interface 604. User interface 604 can be customized the to the unique needs of user or computer system. Additionally, user interface 604 may be built from an open-source JavaScript library, such as React. API-based content management tool 606 may be the same or similar to ACMT 202.

The flow diagram of FIG. 6 further illustrates that API-based content management tool 606 and search engine 612 may utilize search APIs to communicate with one another. API-based content management tool 606 may utilize search APIs to retrieve content from content store 610 or, more particularly, search engine 612 and/or database 614. Content store 610 may be the same or similar to one or more server devices 204. Search engine 612 may be an open-source Java-based search and analytics engine, such as Elasticsearch. Search APIs may comprise RESTful APIs. Search APIs may provide content searching and indexing capabilities. Search APIs may also provide a visual depiction of search analytics, such as tables, graphs, pie charts, etc. Search APIs may further provide a full text-based search of database 614. Moreover, search APIs may include image search APIs and/or audio search APIs that provide for an image and/or audio search of database 614.

As indicated in the flow diagram of FIG. 6, memory of search engine 612 may store reference data, which may include an indication of one or more paths that identify locations where content is stored within database 614 of content store 610. Database 614 may be the same or similar to one or more databases 206. Database 614 may be a cloud-based key-value database, such as Amazon Simple Storage Service, i.e., Amazon S3. Additionally, as is also indicated in the flow diagram of FIG. 6, memory of search engine 612 may store metadata. The memory of search engine 612 may store metadata and reference data as JSONs.

As is also indicated in the flow diagram of FIG. 6, database 608 may store all ACMT data apart from content, which may be stored in database 614 of content store 610. Database 608 may be a relational database, which may be the same or similar to one or more databases 206. Database 608 may a database that utilizes an object-relational database model, such as Oracle database.

Accordingly, with this technology, an optimized process for operating a customizable API-based content management system that is scalable yet stable and that can store any type of content and associated metadata, is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for operating an application program interface (API)-based content management system (CMS), the method comprising:
    selecting, by an application that is based on a microservices architecture, a user interface from among a plurality of user interfaces;
    communicating, by the application, with the user interface via content APIs that provide for content creation, content modification, content storage, and content retrieval;
    storing, by the application, within a relational database, relational data, identification data, and access control data;
    storing, by the application, within a content store that comprises an object storage database, content as objects in buckets of the object storage database, wherein the objects comprise at least one from among a web document, image file, audio file, and video file;
    communicating, by a search engine, with the application via search APIs that provide for a full text-based search of the object storage database;
    storing, by the search engine, within memory of the search engine, metadata that corresponds to the content;
    storing, by the search engine, within the memory, reference data that corresponds to the content, wherein the reference data comprises a path to the content, and wherein vulnerabilities of the CMS are removed by upgrading the application;
    receiving, from the user interface via the content APIs, a first request for first content;
    determining, by comparing access control data, whether the first content comprises permitted first content pieces;
    transmitting, via the search APIs, a request for the permitted first content pieces to the search engine;
    receiving, from the search engine via the search APIs, first permitted metadata that respectively corresponds to the permitted first content pieces and first permitted reference data that respectively corresponds to the permitted first content pieces;
    utilizing, by the application, the first permitted metadata and the first permitted reference data to assemble the permitted first content pieces, wherein the first permitted metadata indicates a size of the permitted first content pieces and a location of the permitted first content pieces; and
    assembling, according to the first permitted metadata and the first permitted reference data, the permitted first content pieces together to produce a permitted first content.

2. The method of claim 1, further comprising:
    breaking up, by the application, the first content into first content pieces;
    creating, by the application, first respective metadata that respectively correspond to the first content pieces;
    storing, by the application, within the object storage database, the first content pieces as a respective first set of objects;
    transmitting, by the application, to the search engine, the first respective metadata that respectively correspond to the first content pieces;
    transmitting, by the application, to the search engine, first respective reference data that respectively correspond to the first content pieces;
    storing, by the search engine, within the memory, the first respective metadata that respectively correspond to the first content pieces; and
    storing, by the search engine, within the memory, the first respective reference data that respectively correspond to the first content pieces.

3. The method of claim 2, further comprising:
    receiving, by the user interface, from a user, a request for the first content;
    transmitting, by the user interface, to the application, the request for the first content;
    receiving, by the application, from the user interface, the request for the first content;
    determining, by the application, which of the first content pieces are permitted first content pieces, by utilizing the identification data and the access control data;
    transmitting, by the application, to the search engine, a request for the permitted first content pieces;
    receiving, by the application, from the search engine, permitted first reference data that respectively correspond to the permitted first content pieces;
    receiving, by the application, from the search engine, permitted first metadata that respectively correspond to the permitted first content pieces;
    retrieving, by the application, from the object storage database, the permitted first content pieces, by utilizing the permitted first reference data that respectively correspond to the permitted first content pieces;
    assembling, by the application, the permitted first content pieces to create permitted first content, by utilizing the permitted first metadata that respectively correspond to the permitted first content pieces; and transmitting, by the application, the permitted first content to the user interface to present to the user.

4. The method of claim 3, further comprising:
providing, by the application, to the user interface, placeholders to present along with the permitted first content; and
presenting, by the user interface, the placeholders along with the permitted first content,
wherein the placeholders are presented in place of redacted first content with respect to the first content, the first content comprises the permitted first content and the redacted first content, and the permitted first content is different from the redacted first content.

5. The method of claim 1, further comprising:
receiving, by the user interface, from a user, identification information and access control information;
transmitting, by the user interface, to the application, the identification information and the access control information; and
controlling, by the application, access to the content, by utilizing the identification data, the access control data, the identification information, and the access control information.

6. The method of claim 1, further comprising:
utilizing by the application, implicit data of a user to determine identification information of the user,
wherein the identification information of the user comprises a job of the user and a department in which the user works; and
determining, by the application, by utilizing the access control data, the identification data and the identification information of the user, whether the user is permitted to access a first content.

7. The method of claim 1,
wherein the plurality of user interfaces are customized to be fully compatible with corresponding computer systems of an organization,
wherein there is a one-to-one correspondence between the plurality of user interfaces and the corresponding computer systems of the organization; and
wherein the corresponding computer systems utilize the content in a unique manner from each other.

8. A system for operating an application program interface (API)-based content management system (CMS), the system comprising:
a processor;
an application that is based on a microservices architecture, wherein the application is configured to select a user interface from among a plurality of user interfaces;
the user interface that communicates with the application via content APIs that provide for content creation, content modification, content storage, and content retrieval;
a relational database that stores relational data, identification data, and access control data; and
a content store that comprises: an object storage database that stores content as objects in buckets, wherein the objects comprise at least one from among a web document, image, audio file, and video file; and
a search engine that comprises memory, wherein the search engine is configured to:
communicate with the application via search APIs that provide for a full text-based search of the object storage database;
store, within the memory, metadata that corresponds to the content; and
store, within the memory, reference data that corresponds to the content,
wherein the reference data comprises a path to the content, and wherein vulnerabilities of the CMS are removed by upgrading the application, wherein the application utilizes the metadata to assemble pieces of the content.

9. The system of claim 8, wherein:
the application is configured to:
break up, by the application, a first content into first content pieces;
create first respective metadata that respectively correspond to the first content pieces;
store, within the object storage database, the first content pieces as a respective first set of objects;
transmit, to the search engine, the first respective metadata that respectively correspond to the first content pieces; and
transmit, to the search engine, first respective reference data that respectively correspond to the first content pieces;
the object storage database is configured to store the respective first set of objects; and
the search engine is further configured to:
store, within the memory, the first respective metadata that respectively correspond to the first content pieces; and
store, within the memory, the first respective reference data that respectively correspond to the first content pieces.

10. The system of claim 9, wherein:
the user interface is configured to:
receive, from a user, a request for the first content;
transmit, to the application, the request for the first content; and
the application is further configured to:
receive, from the user interface, the request for the first content;
determine which of the first content pieces are permitted first content pieces, by utilizing the identification data and the access control data;
transmit, to the search engine, a request for the permitted first content pieces;
receive, from the search engine, permitted first reference data that respectively correspond to the permitted first content pieces;
receive, from the search engine, permitted first metadata that respectively correspond to the permitted first content pieces;
retrieve, from the object storage database, the permitted first content pieces, by utilizing the permitted first reference data that correspond to the permitted first content pieces;
assemble the permitted first content pieces to create permitted first content, by utilizing the permitted first metadata that correspond to the permitted first content pieces; and
transmit the permitted first content to the user interface to present the permitted first content to the user.

11. The system of claim 10, wherein:
the application is further configured to provide, to the user interface, placeholders to present along with the permitted first content; and
the user interface is further configured to:
present the placeholders along with the permitted first content, wherein the placeholders are presented in place of redacted first content with respect to the first content, the first content comprises the permitted first content and the redacted first content, and the permitted first content is different from the redacted first content.

12. The system of claim 8, wherein:
the user interface is configured to:
receive, from a user, identification information and access control information; and
transmit, to the application, the identification information and the access control information; and
the application is configured to control access to the content, by utilizing the identification data, the access control data, the identification information and the access control information.

13. The system of claim 8, wherein the application is configured to:
utilize implicit data of a user to determine identification information of the user,
wherein the identification information of the user comprises a job of the user and a department in which the user works; and
determine, by utilizing the access control information and the identification information of the user, whether the user is permitted to access a first content.

14. The system of claim 8,
wherein the plurality of user interfaces are customized to be fully compatible with corresponding computer systems of an organization,
wherein there is a one-to-one correspondence between the plurality of user interfaces and the corresponding computer systems of the organization; and
wherein the corresponding computer systems utilize the content in a unique manner from each other.

15. A non-transitory computer-readable storage medium that stores instructions for operating an application program interface (API)-based content management system (CMS), wherein the instructions comprise:
selecting, by an application that is based on a microservices architecture, a user interface from among a plurality of user interfaces;
communicating, by the application that is based on a microservices architecture, with the user interface via content APIs that provide for content creation, content modification, content storage, and content retrieval;
storing, by the application, within a relational database, relational data, identification data, and access control data;
storing, by the application, within a content store that comprises an object storage database, content as objects in buckets of the object storage database,
wherein the objects comprise at least one from among a web document, image file, audio file, and video file;
communicating, by a search engine, with the application via search APIs that provide for a full text-based search of the object storage database;
storing, by the search engine, within memory of the search engine, metadata that corresponds to the data;
storing, by the search engine, within the memory, reference data that corresponds to the data,
wherein the reference data comprises a path to the data, and
wherein vulnerabilities of the CMS are removed by upgrading the application;
receiving, from the user interface via the content APIs, a first request for first content;
determining, by comparing access control data, whether the first content comprises permitted first content pieces;
transmitting, to the search engine via the search APIs, a request for the permitted first content pieces;
receiving, from the search engine via the search APIs, first permitted metadata that respectively corresponds to the permitted first content pieces and permitted reference data that respectively corresponds to the permitted first content pieces;
utilizing, by the application, the first permitted metadata and the first permitted reference data to assemble the permitted first content pieces, wherein the first permitted metadata indicates a size of the permitted first content pieces and a location of the permitted first content pieces; and
assembling, according to the first permitted metadata and the first permitted reference data, the permitted first content pieces together to produce a permitted first content.

16. The non-transitory computer-readable storage medium of claim 15, wherein the instructions further comprise:
breaking up, by the application, the first content into first content pieces;
creating, by the application, first respective metadata that respectively correspond to the first content pieces;
storing, by the application, within the object storage database, the first content pieces as a respective first set of objects;
transmitting, by the application, to the search engine, the first respective metadata that respectively correspond to the first content pieces;
transmitting, by the application, to the search engine, first respective reference data that respectively correspond to the first content pieces;
storing, by the search engine, within the memory, the first respective metadata that respectively correspond to the first content pieces; and
storing, by the search engine, within the memory, the first respective reference data that respectively correspond to the first content pieces.

17. The method of claim 1, wherein the user interface includes a rich text editor that has been utilized to create a first content.

18. The system of claim 8, wherein the user interface includes a rich text editor that has been utilized to create a first content.

19. The method of claim 1, wherein the relational data comprises at least one location of a display of at least one from among a logo, trademark, and letterhead.

20. The system of claim 8, wherein the object storage database is separate and distinct from the memory, wherein the object storage database stores the content, and wherein the memory stores the metadata that corresponds to the content.

* * * * *